2 Sheets—Sheet 1.

C. LINFORD.
Underground Telegraphs.

No. 224,551. Patented Feb. 17, 1880.

Witnesses.
L. C. Aler
Jno K Smith

Inventor.
Charles Linford
by Bakewell & Kerr
Attorneys

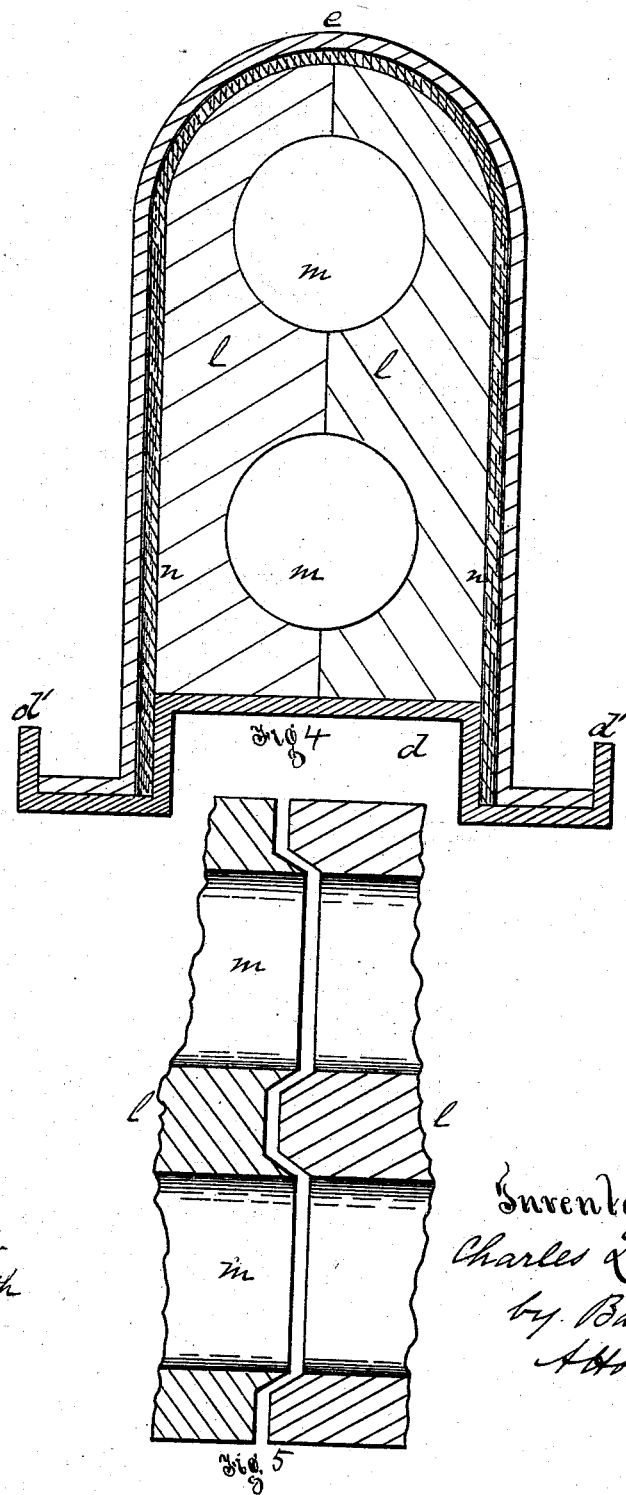

United States Patent Office.

CHARLES LINFORD, OF PITTSBURG, PENNSYLVANIA.

UNDERGROUND TELEGRAPH.

SPECIFICATION forming part of Letters Patent No. 224,551, dated February 17, 1880.

Application filed November 15, 1879.

*To all whom it may concern:*

Be it known that I, CHARLES LINFORD, of Pittsburg, in the county of Allegheny and State of Pennsylvania, have invented a new and useful Improvement in Surface and Underground Telegraphs; and I do hereby declare the following to be a full, clear, and exact description thereof, reference being had to the accompanying drawings, forming part of this specification, in which—

Figure 2:
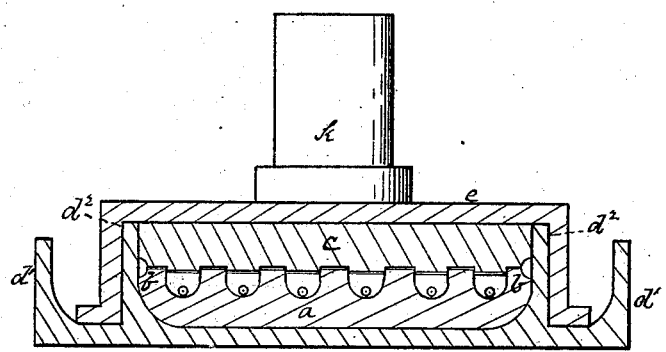
Figure 3:
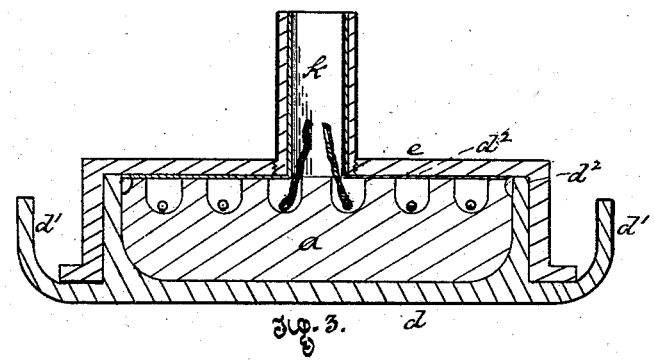
Figure 1:
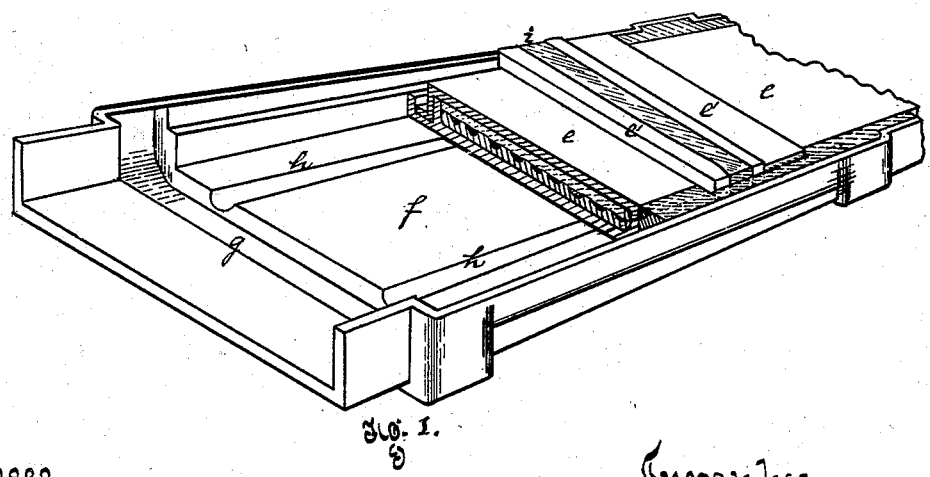

Figure 1 is a perspective view of the wire-conduit, showing the coupling-box. Fig. 2 is a sectional view of the wire-conduit. Figs. 3, 4, and 5 are sectional views of modifications, the latter being a cross-section of the glass wire-bed of Fig. 4.

Like letters of reference indicate like parts in each.

My invention relates to the construction of conduits or beds for laying surface and underground-telegraph wires; and it consists of a sectional glass or porcelain insulating conduit or bed for containing one or more wires, having an outer metallic sectional casing.

To enable others skilled in the art to make and use my invention, I will proceed to describe it.

The drawings are designed to illustrate the construction and use of a conduit for a number of wires. It has a fluted, grooved, or channeled glass or porcelain plate or bed, $a$, which is provided with bevels $b$ at the edges. On the bed $a$ is a glass or porcelain lid, $c$, either plain or grooved, as shown, on its under face. This conduit and lid are made in sections of any desired length. It is placed in an outer sectional metallic shell or casing, $d$, having a sectional cover, $e$, adapted to fit within the flanges $d'$ and rest upon the shoulders $d^2$.

The sections of the casing $d$ are of any desired length, and are united by a coupling-box, $f$, which overlaps the ends of the adjoining sections, and is provided with transverse grooves $g$ and longitudinal grooves $h$, connecting the transverse grooves. The cover-sections $e$ are provided with tongue-and-groove joints, and with flanges $e'$, which, when the sections are placed together, form a groove, $i$. The sections $d$ are secured in the coupling-box by screws or in other suitable manner.

In laying my improved conduit the casing $d$ is first laid, the glass or porcelain bed then put in it, and the wires laid in the grooves. A cord saturated with paraffine or other suitable cement is laid in the bevels $b$, to seal the joint between the lid and bed, and the glass or porcelain lid $c$ laid on the bed, the wires in the grooves being thereby sealed tightly in an insulating casing. The cover $e$ is then put on and the joints of the casing and cover sealed tightly by a suitable cement poured into the grooves $g$, $h$, and $i$. For leading the wires up out of the ground a glass or porcelain pipe or a vitreously-lined metallic pipe, $k$, is used.

When glass or porcelain conduits alone are used they will sweat, and are therefore injurious to the wires. I therefore provide the moisture-tight metallic casing to surround and inclose the wire-conduit. I prefer, however, to coat the interior of the casing and its cover with a vitreous coating—such, for instance, as porcelain enamel—and then the lid $c$ of the wire-conduit may, if desired, be dispensed with, and the cover made to fit down close on the top of the conduit $a$. (See Fig. 2.) The casing and its cover may, however, be coated internally with pitch, coal-tar, tin, or other suitable coating. They may also be coated externally to prevent rusting.

Any desired number of grooves or channels may be made in the bed $a$, from one upward, and they may be of any suitable size or shape. If two or more wires are placed in the same groove, they should be insulated from each other by a suitable coating. If but one wire is placed in each, the ordinary telegraph-wire may be used.

Other forms of casing may be used; but I prefer the form and construction shown.

Figs. 4 and 5 show a form especially adapted for telegraph-wire cables, although it may be used for either one or a number of separate wires. Here the wire-conduit is composed of two pieces, $l$ $l$, of glass or porcelain, having the channel $m$ between them. Around the glass pieces is a blanket, $n$, of suitable cloth, felt, or similar material, immersed in paraffine or other suitable substance to render it water-tight, and the same device is equally applicable to and advantageous when applied to the devices shown in Figs. 1, 2, and 3 of the drawings.

The casing $d$ $e$ is cemented and the sections coupled in the manner described in connection with Fig. 1. The adjoining ends of the glass sections *l* are provided with tongues and sockets, so as to be fitted together, and thus make a better and more perfect joint.

The saturated blanket *n* may also be made with insulating properties.

I also propose, in case it is desired to guard absolutely against the presence of moisture in the wire-channels, to fill them with tallow or other similar material, which, being poured in a liquid state, will harden therein around the wires. The grooves may be filled with the said material either through the uptake pipes *k* or in any other suitable way.

One advantage of this construction is that the sections can be finished in the shop, and then laid without further trouble than that of coupling.

The conduit and its casing can be made at low cost, are very durable, protect the wires perfectly from moisture, are accessible at any desired point, so that repairs can be easily and quickly made, can be easily and cheaply laid, and will contain a great number of wires, thereby obtaining great economy of space.

What I claim as my invention, and desire to secure by Letters Patent, is—

1. In combination with and placed inside of a sectional covered box, a sectional channeled, fluted, or grooved glass or porcelain plate or wire-conduit, having a glass or porcelain cover, substantially as and for the purposes described.

2. In combination with and placed inside of a sectional covered box having a vitreous lining, a sectional channeled, fluted, or grooved glass or porcelain wire-conduit, either with or without a glass or porcelain cover, substantially as and for the purposes described.

3. A sectional grooved or channeled glass or porcelain wire-conduit, in combination with a water-tight blanket, of felt or other suitable material, and an external metallic casing, substantially as and for the purposes described.

4. In combination with and placed inside of a sectional covered box, a channeled, fluted, or grooved glass or porcelain wire-conduit, having a cover with sealed joints, substantially as and for the purposes described.

In testimony whereof I, the said CHARLES LINFORD, have hereunto set my hand.

CHARLES LINFORD.

Witnesses:
T. B. KERR,
R. H. WHITTLESEY.